United States Patent
Sorin (10) Patent No.: US 8,369,706 B2
(45) Date of Patent: Feb. 5, 2013

(54) OPEN ACCESS SERVICE MODEL USING WDM-PON

(75) Inventor: Wayne V. Sorin, Mountain View, CA (US)

(73) Assignee: Novera Optics, Inc., Santa Clara, CA (US)

( * ) Notice: Subject to any disclaimer, the term of this patent is extended or adjusted under 35 U.S.C. 154(b) by 675 days.

(21) Appl. No.: 11/489,396

(22) Filed: Jul. 18, 2006

(65) Prior Publication Data

US 2008/0019693 A1 Jan. 24, 2008

(51) Int. Cl.
*H04J 14/00* (2006.01)

(52) U.S. Cl. ............... 398/72; 398/34; 398/45; 398/50; 398/66; 398/67; 398/68; 398/69; 398/70; 398/71

(58) Field of Classification Search .............. 398/34, 398/36, 45, 50, 56, 57, 66–72, 79; 385/24, 385/129; 359/124
See application file for complete search history.

(56) References Cited

U.S. PATENT DOCUMENTS

| | | | | |
|---|---|---|---|---|
| 6,005,694 | A * | 12/1999 | Liu | 398/6 |
| 6,169,838 | B1 * | 1/2001 | He et al. | 385/129 |
| 6,256,431 | B1 * | 7/2001 | Mesh | 385/24 |
| 6,400,477 | B1 * | 6/2002 | Wellbrook | 398/45 |
| 6,464,310 | B1 * | 10/2002 | Burns et al. | 312/223.6 |
| 6,798,991 | B1 * | 9/2004 | Davis et al. | 398/19 |
| 7,245,829 | B1 * | 7/2007 | Sindile | 398/45 |
| 2001/0046348 | A1 * | 11/2001 | Sarkimukka et al. | 385/24 |
| 2002/0196491 | A1 * | 12/2002 | Deng et al. | 359/124 |
| 2004/0067059 | A1 | 4/2004 | Song et al. | |
| 2004/0120715 | A1 * | 6/2004 | Shin et al. | 398/91 |
| 2004/0141747 | A1 | 7/2004 | Kenny | |
| 2004/0184806 | A1 | 9/2004 | Lee et al. | |
| 2005/0053376 | A1 * | 3/2005 | Joo et al. | 398/72 |

(Continued)

FOREIGN PATENT DOCUMENTS

| | | |
|---|---|---|
| CN | 1497894 A | 5/2004 |
| CN | 1731750 A | 2/2006 |

(Continued)

OTHER PUBLICATIONS

G. Pesavento, "Ethernet Passive Optical Network (EPON) Architecture for Broadband Access," XP001162954, Optical Networks Magazine, vol. 4, No. 1, pp. 107-113 (Jan. 2003).

(Continued)

*Primary Examiner* — Li Liu
(74) *Attorney, Agent, or Firm* — Blakely, Sokoloff, Taylor & Zafman LLP (57) ABSTRACT

Methods and apparatuses to provide an "Open access" service model using wavelength division multiplexing ("WDM") passive optical networks ("PONs") are described. A cross-connect is used to supply a first set of optical signals corresponding to a first service provider and a second set of optical signals corresponding to a second service provider to a WDM multiplexer/demultiplexer. The WDM multiplexer/de-multiplexer is used to multiplex and transmit the first set and the second set to a remote location. Another WDM multiplexer/de-multiplexer at the remote location is used to de-multiplex the first set and the second set. The first set may be supplied to a first user and the second set may be supplied to a second user. Transceivers coupled to the cross-connect may be used to generate the optical signals. For one embodiment, the transceivers include a wavelength-locked light source. For one embodiment, the transceivers are alike.

22 Claims, 8 Drawing Sheets

U.S. PATENT DOCUMENTS

| | | | |
|---|---|---|---|
| 2005/0088724 A1 | 4/2005 | Lee et al. | |
| 2005/0276603 A1* | 12/2005 | Jung et al. | 398/71 |
| 2005/0286895 A1* | 12/2005 | Lee et al. | 398/79 |
| 2006/0045520 A1* | 3/2006 | Nakano et al. | 398/33 |
| 2006/0045542 A1* | 3/2006 | Lee et al. | 398/195 |
| 2008/0013694 A1* | 1/2008 | Ward | 379/1.01 |

FOREIGN PATENT DOCUMENTS

| | | |
|---|---|---|
| JP | 2000-134153 | 5/2000 |
| JP | 2002-139403 | 5/2002 |
| JP | 2004-208310 | 7/2004 |
| JP | 2004-282749 | 10/2004 |
| JP | 2005-130507 | 5/2005 |
| JP | 2005-536078 | 11/2005 |
| JP | 2006-05934 | 1/2006 |
| WO | WO 2005/076942 | 8/2005 |

OTHER PUBLICATIONS

Bokrae Jung, et al., "Performance Evaluation of Novel MAC Protocol for WDM/Ethernet-PON," XP019033211, Computational Science—ICCS 2006 Lecture Notes in Computer Science, vol. 3994, pp. 152-155 (May 10, 2006).

Glen Kramer, et al., "Ethernet Passive Optical Network (EPON): Building a Next-Generation Optical Access Network," XP011092771, IEEE Communications Magazine, vol. 40, No. 2, pp. 66-73 (Feb. 2002).

PCT Notification of Transmittal of The International Search Report and the Written Opinion of the International Searching Authority or The Declaration for PCT Counterpart Application No. PCT/US2007/011271 Containing International Search Report, 13 pgs (Apr. 2, 2008).

Banerjee, Anupam et al., "Towards Technologically and Competitively Neutral Fiber to the Home Infrastructure," Carnegie Mellon University.

* cited by examiner

OPEN ACCESS SERVICE MODEL USING WDM-PON

FIELD

Embodiments of the invention relate to Wavelength Division Multiplexing Passive Optical Networks ("WDM PONs"), and more specifically, to WDM PONs for open access model service.

BACKGROUND

Generally, an "Open Access" service model refers to a network architecture where multiple Service Providers ("SPs") share the common data-link layer that typically belongs to the network owner, to provide voice, video, and data services. A typical example of an "Open Access" service model is various Internet Service Providers ("ISPs") that compete to provide Internet access to residents and businesses over a wired network. In Passive Optical Networks ("PONs"), passive optical components, e.g., fibers, splitters and couplers, are provided to guide traffic between a Central Office ("CO") and termination points at the customer premises. The passive optical components do not have power or processing requirements thereby lowering overall maintenance costs.

Figure 1:
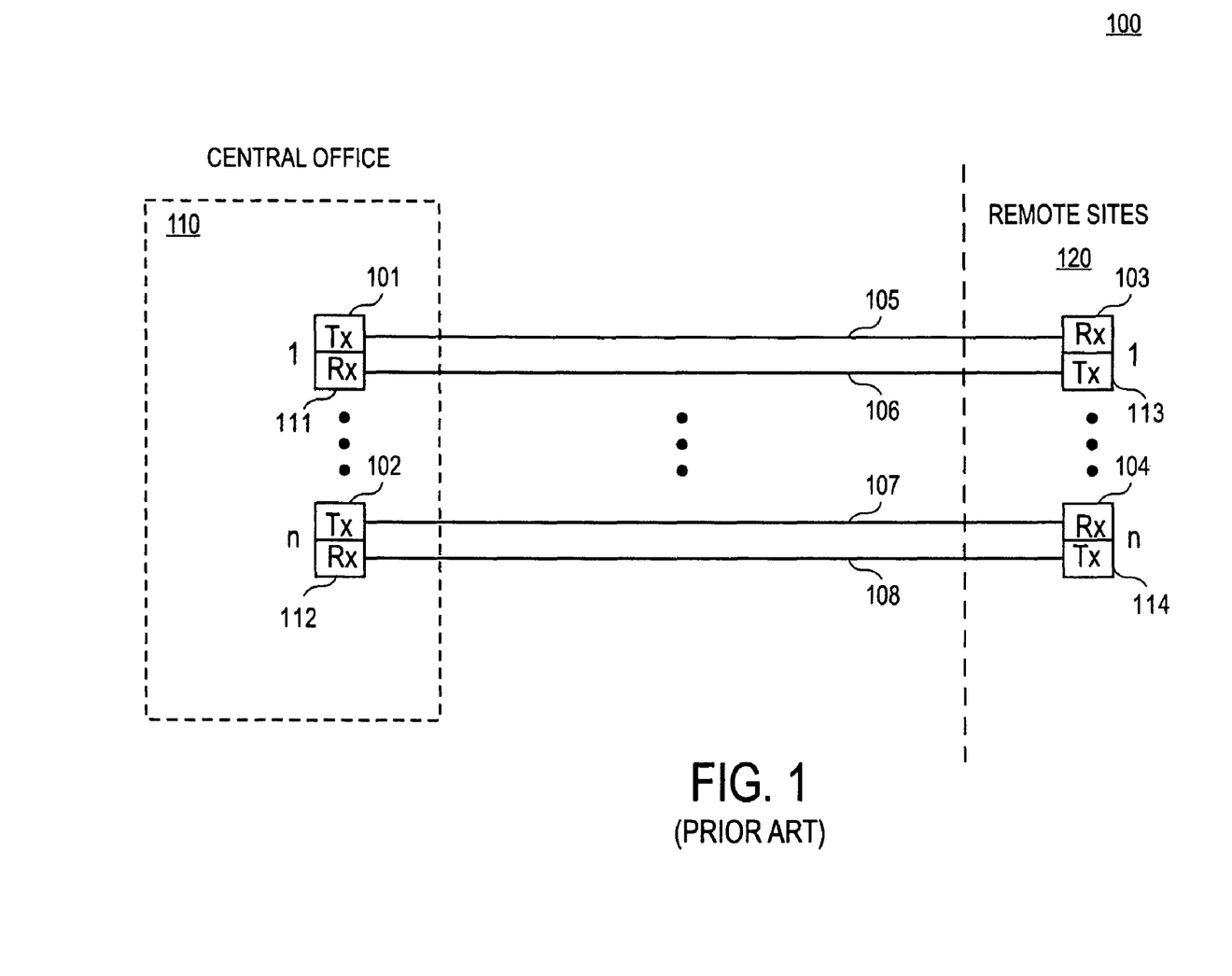
FIG. 1 shows a typical PON for a point-to-point connection architecture.

FIG. 1 shows a typical PON 100 for a point-to-point connection architecture. As shown in FIG. 1, each customer (1 ... n) at remote sites 120 is connected to a respective pair of transmitters and receivers (1 ... n) at central office 110 by a dedicated pair of optical fibers. As shown in FIG. 1, receiver Rx 103 at customer 1 is connected to transmitter Tx 101 at Central Office 110 using a fiber 105, transmitter Tx 113 at customer 1 is connected to receiver Rx 111 at CO 110 using a fiber 106, receiver Rx 104 at customer n is connected to transmitter Tx 102 at CO 110 by a fiber 107, transmitter Tx 114 at customer n is connected to receiver Rx 112 at CO 110 by fiber 108. As shown in FIG. 1, such a point-to-point connectivity where each receiver and transmitter at remote sites 120 has an individual fiber connection to a transmitter and receiver at the CO requires a lot of fibers and therefore is expensive.

Figure 2:
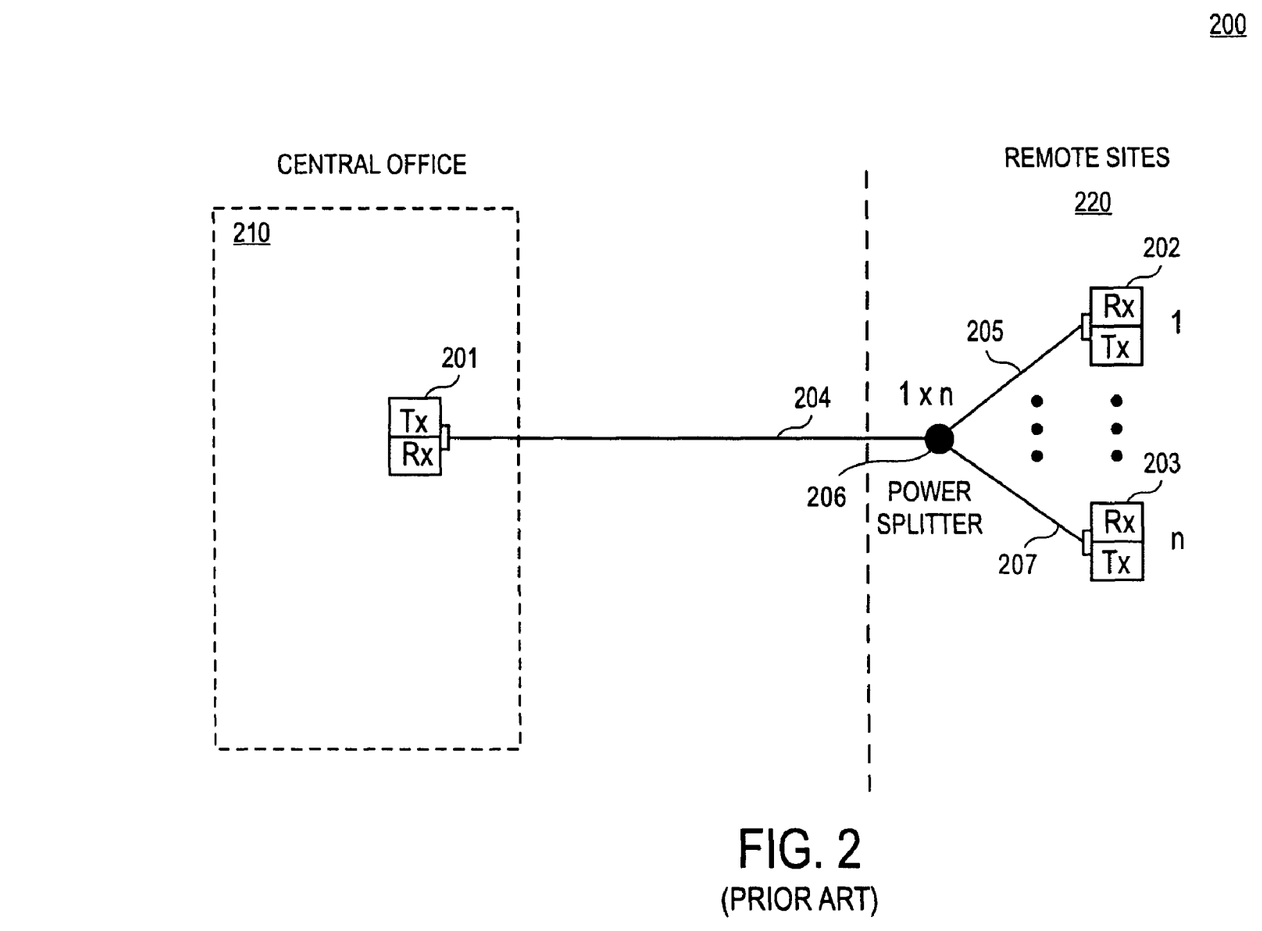
FIG. 2 shows a typical Time Domain Mulitplexed ("TDM") PON architecture.

FIG. 2 shows a typical Time Domain Mulitplexed ("TDM") PON architecture. As shown in FIG. 2, CO 210 has an Optical Line Termination ("OLT") unit 201 that consists of a single transmitter Tx and receiver Rx pair. OLT unit 201 is connected to customers (1 ... n) at remote sites 220 through a feeder fiber 204, a power splitter 206, and individual distribution fibers (1 ... n). As shown in FIG. 2, feeder fiber 204 transmits optical signals from OLT unit 201 at CO 210 to optical power splitter 206 located at a remote location. The optical signals are distributed from optical power splitter 206 to optical network units ("ONUs") (1 ... n) located at customer premises through distribution fibers (1 ... n). As shown in FIG. 2, ONU 202 consisting of one receiver Rx and transmitter Tx pair is connected to power splitter by fiber 205, and ONU 203 consisting of another receiver Rx and transmitter Tx pair is connected to power splitter by fiber 207. In TDM PON architecture, the same bandwidth is shared between multiple ONUs, and dedicated transmission time slots are granted to each individual ONU, to avoid data collision. As shown in FIG. 2, all remote users share a common data stream over feeder fiber 204. Therefore, one user can not have more bandwidth without decreasing the bandwidth of other users. Furthermore, all remote users share a single transmitter/receiver pair of OLT unit 201 at CO 210, as shown in FIG. 2. The single transmitter/receiver pair of OLT unit 201 at the CO is difficult to share between multiple service providers. As such, TDM-PONs do not support Open Access service model.

SUMMARY

Embodiments of wavelength division multiplexing ("WDM") passive optical networks ("PONs") to provide an "Open Access" service model are described. An apparatus comprises a cross-connect having inputs and outputs. The cross-connect can connect any of the inputs with any of the outputs. The cross-connect is to provide a first set of optical signals corresponding to a first service provider and a second set of optical signals corresponding to a second service provider. A first wavelength division multiplexing ("WDM") multiplexer/de-multiplexer has a first wavelength channel and a second wavelength channel. The first wavelength channel and the second wavelength channel are coupled to the cross-connect to multiplex the first set of the optical signals and the second set of the optical signals to transmit to a remote location in a first direction. The cross-connect is to supply the first set to the first wavelength channel and to supply the second set to the second wavelength channel.

Other features and advantages of embodiments of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, in which.

DETAILED DESCRIPTION

Embodiments of wavelength division multiplexing ("WDM") passive optical networks ("PONs") to provide an "Open Access" service model are described. A WDM-PON provides a connection between a plurality of service providers ("SPs") and a plurality of users at remote sites. The WDM-PON has an optical point-to-point connection between a Central Office ("CO") and each of the users. WDM-PON can be configured so that each of the SPs has a dedicated optical connection to any of the remote users over the shared WDM-PON fiber infrastructure. The WDM-PON includes a cross-connect to supply a first set of optical signals corresponding to a first service provider and a second set of optical signals corresponding to a second service provider to a plurality of users using a WDM router, e.g., WDM multiplexer/demultiplexer ("MUX/De-MUX"). The WDM router is used to multiplex and transmit the first set of the optical signals and the second set of the optical signals to a remote location. Another WDM router, e.g., WDM MUX/De-MUX, at the remote location is used to de-multiplex the first set of the optical signals and the second set of the optical signals. The first set of the optical signals may be supplied to a first user at a remote location and the second set of the optical signals may be supplied to a second user at the remote location. Transceivers coupled to the cross-connect can be used to generate the optical signals. For one embodiment, the transceivers include a wavelength-locked light source. For one embodiment, the transceivers are interchangeable transceivers. For one embodiment, the transceivers are alike, e.g., designed to be identical.

Figure 3:
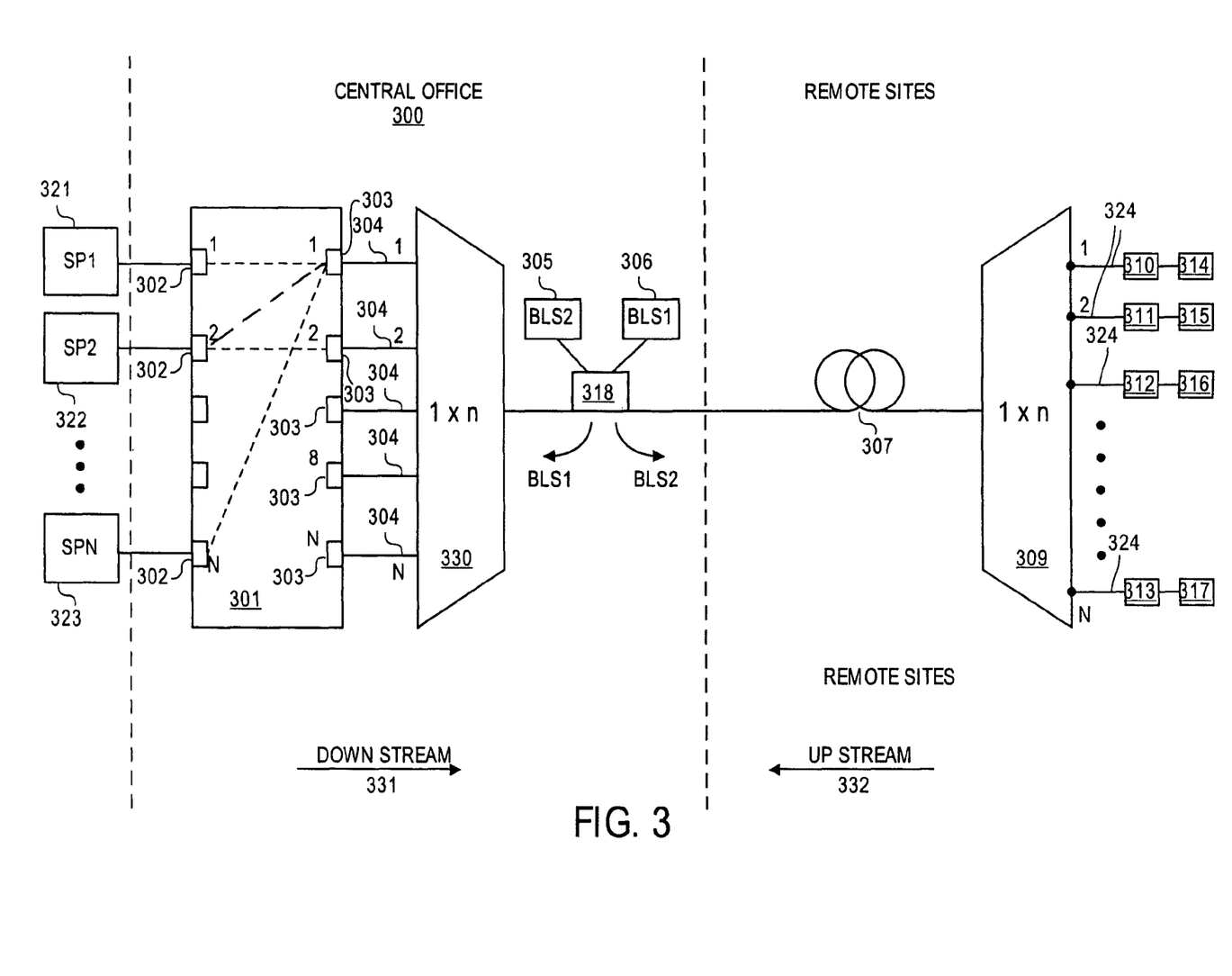
FIG. 3 shows one embodiment of a WDM PON that provides a point-to-point connection between a plurality of service providers and a plurality of users at remote sites.

FIG. 3 shows one embodiment of a WDM PON that provides a point-to-point connection between a plurality of service providers (SP1, SP2, . . . SPN) and a plurality of users (1 . . . N) at remote sites. WDM PON 300 provides an optical point-to-point connection between a central office and each of the users (1 . . . N) at remote sites. The optical connections between service providers SP1, SP2, . . . SPN and remote users (1 . . . N) are easily reconfigurable over WDM PON 300. As shown in FIG. 3, WDM PON 300 includes a cross-connect 301 having inputs 302 (1 . . . N) and outputs 303 (1 . . . N). As shown in FIG. 3, cross connect 301 can connect any of the inputs 302 with any of the outputs 303. As shown in FIG. 3, a plurality of service providers SP1, SP2 . . . SPN can supply signals to inputs 302 of the cross-connect 301. As shown in FIG. 3, cross-connect 301 is located at a Central Office, and receives signals from the plurality of service providers SP1 . . . SPN. For one embodiment, service providers (SP1, SP2 . . . SPN) are positioned at remote distances from the central office. For another embodiment, service providers (SP1, SP2 . . . SPN) are positioned at the central office. Cross-connect 301 can connect any of the service providers SP1, SP2 . . . SPN through any of the outputs 303 to any of wavelength channels 304 (1 . . . N) of a MUX/De-MUX 330. For one embodiment, a transceiver (not shown) is coupled to cross-connect 301 to generate the optical signals corresponding to the SP1, and another transceiver (not shown) is coupled to cross-connect 301 to generate the optical signals corresponding to the SP2. The transceivers may include e.g., a wavelength-locked light source, and a wavelength specific light source, or any combination thereof. For one embodiment, the transceiver that generates optical signals corresponding to the SP1 and another transceiver that generates optical signals corresponding to the SP2 are interchangeable transceivers that are designed to be identical; although they are each capable of operating at different output wavelengths. The transceivers are described in further detail below with respect to FIGS. 5-8. For one embodiment, the optical signals are transmitted over WDM PON 300 along wavelength channels spaced from each other according to standards of Dense Wavelength Division Multiplexing ("DWDM") technology, Coarse WDM ("CWDM") technology, or a combination of both. DWDM channel spacing and CWDM channel spacing is known to one of ordinary skill in the art of telecommunications.

For one embodiment, cross-connect 301 includes an N×N optical switch, e.g., an N×N Micro Electro-Mechanical Structures ("MEMS") optical switch. For another embodiment, cross-connect 301 includes an optical fiber patch panel that provides optical connections between any of the service providers (SP1 . . . SPN) and any of wavelength channels 304 through optical fibers. For another embodiment, cross-connect 301 includes an M×N electrical switch, e.g., M×N Ethernet switch, that provides an electrical connection between any of service providers (SP1 . . . SPN) and any of the outputs 303. For another embodiment, outputs 303 of M×N electrical switch are connected to transceivers (not shown) that convert electrical signals received from the service providers (SP1 . . . SPN) to optical signals. The transceivers are described in greater detail below with respect to FIGS. 5-8.

Cross-connect 301 can supply optical signals corresponding to SP1 . . . SPN to respective wavelength channels 304 of WDM MUX/De-MUX 330. WDM MUX/DeMUX 330 multiplexes optical signals received in down stream direction 331 from the central office and de-multiplexes optical signals in up stream direction 332 from remote users 1 . . . N. As shown in FIG. 3, cross-connect 301 supplies a set of one or more optical signals corresponding to a service provider 321 (SP1) to wavelength channel 304 (1). Cross-connect 301 supplies another set of one or more optical signals corresponding to a service provider 322 (SP2) to another wavelength channel 304 (2). As shown in FIG. 3, wavelength channel 1 of WDM MUX/De-MUX 330 is coupled to output 1 of cross-connect 301 to receive optical signals corresponding to SP1, as shown in FIG. 3 by a dotted line. A wavelength channel 2 of WDM MUX/De-MUX 330 is coupled to output 2 of cross-connect 301 to receive optical signals corresponding to SP2, as shown in FIG. 3 by the dotted line. WDM MUX/De-MUX 330 multiplexes the optical signals received through wavelength channels 304 and transmits them from a Central Office to a remote location in a down stream direction 331. For one embodiment, WDM MUX/De-MUX 330 is temperature insensitive, so that the wavelength of each of the channels 304 does not change with the temperature. WDM MUX/De-MUXes are described in further detail below. For one embodiment, WDM MUX/De-MUX 330 has at least one wavelength channel that carries wavelengths from multiple wavelength bands, as described in further detail below.

As shown in FIG. 3, WDM MUX/DeMUX 309 at a remote location is coupled to WDM MUX/DeMUX 330 through an optical transmission medium 307, e.g., an optical fiber. WDM MUX/DeMUX 309 having wavelength channels 324 de-multiplexes the optical signals corresponding to SP1 and the optical signals corresponding to SP2 to supply to a remote user 314 and a remote user 315 respectively. As shown in FIG. 3, optical signals corresponding to SP1 are received by a transceiver 310 connected to a wavelength channel 1 of MUX/DeMUX 309, and optical signals corresponding to SP2 are received by a transceiver 311 connected to a wavelength channel 2 of MUX/DeMUX 309.

WDM MUX/DeMUX 309 multiplexes optical signals that are transmitted by transceivers of respective remote users 1 . . . N in up stream direction 332. As shown in FIG. 3, WDM MUX/DeMUX 309 multiplexes optical signals transmitted from transceiver 310 and 311 to send to SP1 and SP2 respectively. Transceivers 310, 311, 312, and 313 that are connected to respective users 314, 315, 316, and 317 may include e.g., a wavelength-locked light source, a wavelength specific light source, or any combination thereof. For one embodiment, transceivers 310, 311, 312, and 313 are interchangeable. The transceivers are described in further detail below with respect to FIGS. 5-8.

For one embodiment, broadband light source 306 coupled to WDM MUX/DeMUX 330 at the central office location provides an injection signal BLS 1 through optical coupler 318 to lock a wavelength of a wavelength-locked light source of a transceiver coupled to a respective service provider, as shown in FIG. 3. For one embodiment, broadband light source 305 that may be located at the central office and coupled to WDM MUX/DeMUX 309 through optical transmission medium 307 (e.g., an optical fiber) provides an injection signal BLS 2 through optical coupler 318 to lock a wavelength of a wavelength-locked light source of a transceiver coupled to a respective user, as shown in FIG. 3. Providing the injection signals to lock a wavelength of the wavelength-locked light source is described in further detail below with respect to FIGS. 5-8. For one embodiment, each wavelength channel of the WDM-PON 300 can transmit data at different data rates, e.g., 125 Megabits per second ("Mbps"), 155 Mbps, 622 Mbps, 1.25 Gigabits per second ("Gbps"), 2.5 Gbps, 10 Gbps, or 40 Gbps, and different protocols, e.g., Ethernet, ATM, SONET, etc.

Figure 4:
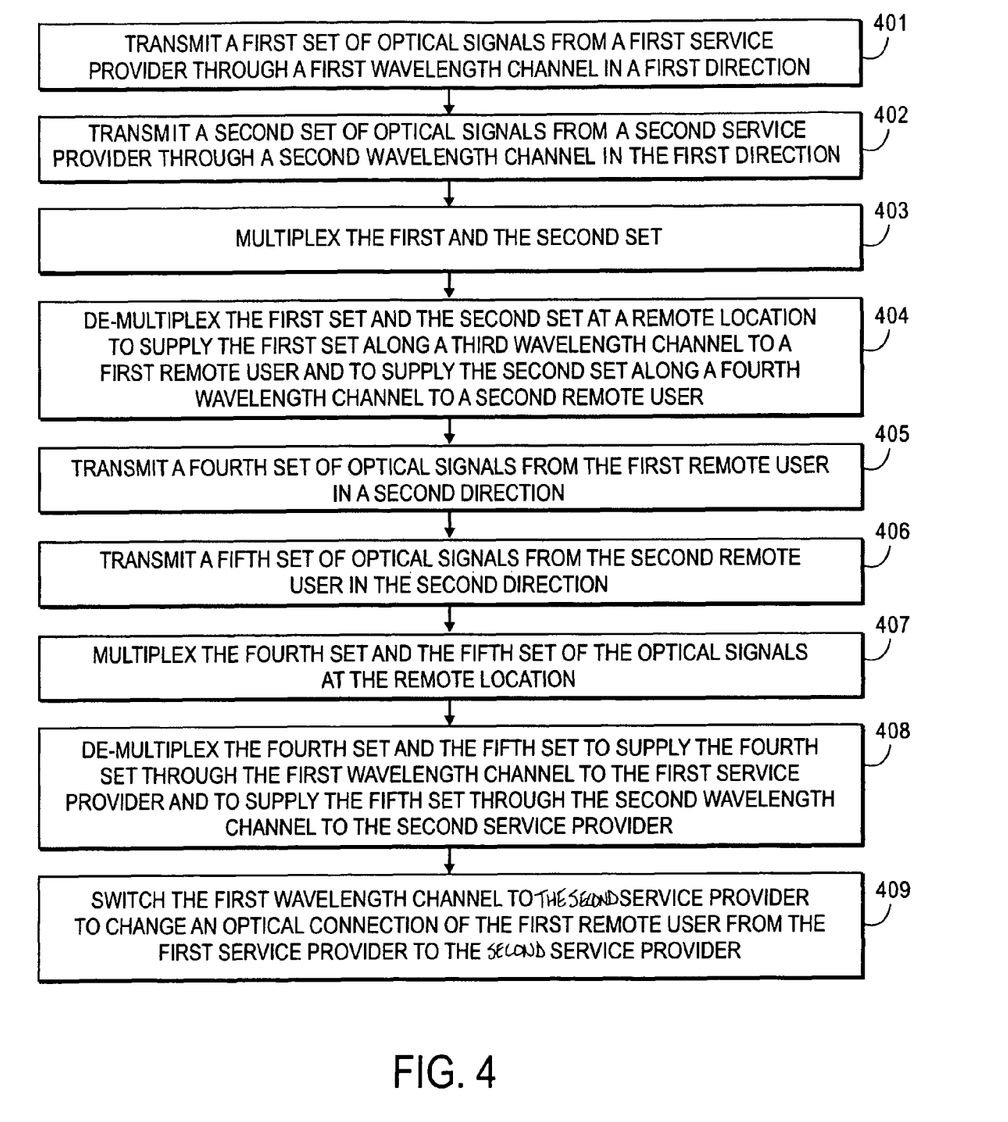
FIG. 4 is a flowchart of one embodiment of a method to provide an open service model using WDM PON.

FIG. 4 is a flowchart of one embodiment of a method to provide an open service model using WDM PON. Method begins with operation 401 that involves transmitting a first set of optical signals corresponding to a first service provider through a first wavelength channel in a first direction, as described above with respect to FIG. 3. Method continues with operation 402 that involves transmitting a second set of optical signals corresponding to a second service provider through a second wavelength channel in the first direction, as described above. Method continues with operation 403 that involves multiplexing the first set of the optical signals and the second set of the optical signals, as described above. Further, operation 404 is performed that involves de-multiplexing the first set and the second set of the optical signals at a remote location to supply the first set of the optical signals through a third wavelength channel to a first remote user and to supply the second set of optical signals through a fourth wavelength channel to a second remote user, as described above. Next, operation 405 that involves transmitting a fourth set of optical signals from the first remote user in a second direction is performed as described above. Further, method 400 continues with operation 406 of transmitting a fifth set of the optical signals from the second remote user in the second direction. Further, operation 407 of multiplexing the fourth set and the fifth set of the optical signals at the remote location is performed, as described above. Next, method 400 continues with operation 408 of de-multiplexing the fourth set and the fifth set to supply the fourth set of the optical signals through the first wavelength channel to the first service provider and to supply the fifth set of the optical signals through the second wavelength channel to the second service provider, as described above. Next, operation 409 that involves switching the first wavelength channel to the second service provider to change an optical connection of the first remote user from the first service provider to the second service provider is performed. For one embodiment, an operation (not shown) that involves switching the first wavelength channel to a third service provider to change an optical connection of the first remote user from the first service provider to the third service provider is performed.

Referring back to FIG. 3, a point-to-point optical connection can be changed to switch remote user 314 from SP1 to SP2 by switching the connection of wavelength channel 1 of MUX/De-MUX 330 from input 1 to input 2 of cross-connect 301. The connection between input 1 and output 1 of cross-connect 301 can be switched to connection between input 2 to output 1, as shown in FIG. 3. For another embodiment, a point-to-point optical connection can be changed to switch remote user 314 from SP1 to SPN by switching the connection of wavelength channel 1 of MUX/De-MUX 330 from input 1 to input N of cross-connect 301, as shown in FIG. 3.

The connection between input 1 and output 1 of cross-connect 301 can be switched to connection between input N to output 1, as shown in FIG. 3. For one embodiment, switching the wavelength channel 1 of MUX-De-MUX 330 to SPN involves setting a wavelength of optical signals corresponding to service provider SPN, so that the optical signals transmit through the wavelength channel 1. For one embodiment, the wavelength of optical signals corresponding to service provider SPN is set by injection signal that is transmitted from broadband source ("BLS") 306 through channel 1 to lock the wavelength of the wavelength-locked light source of the transmitter (not shown) that provides optical signals to the service provider SPN, as described in further detail below. For another embodiment, the wavelength of optical signals corresponding to service provider SPN is set by tuning the wavelength of the wavelength specific light source (not shown) of the transmitter that provides optical signals to the service provider SPN, e.g., a tunable laser, as described in further detail below.

Figure 5:
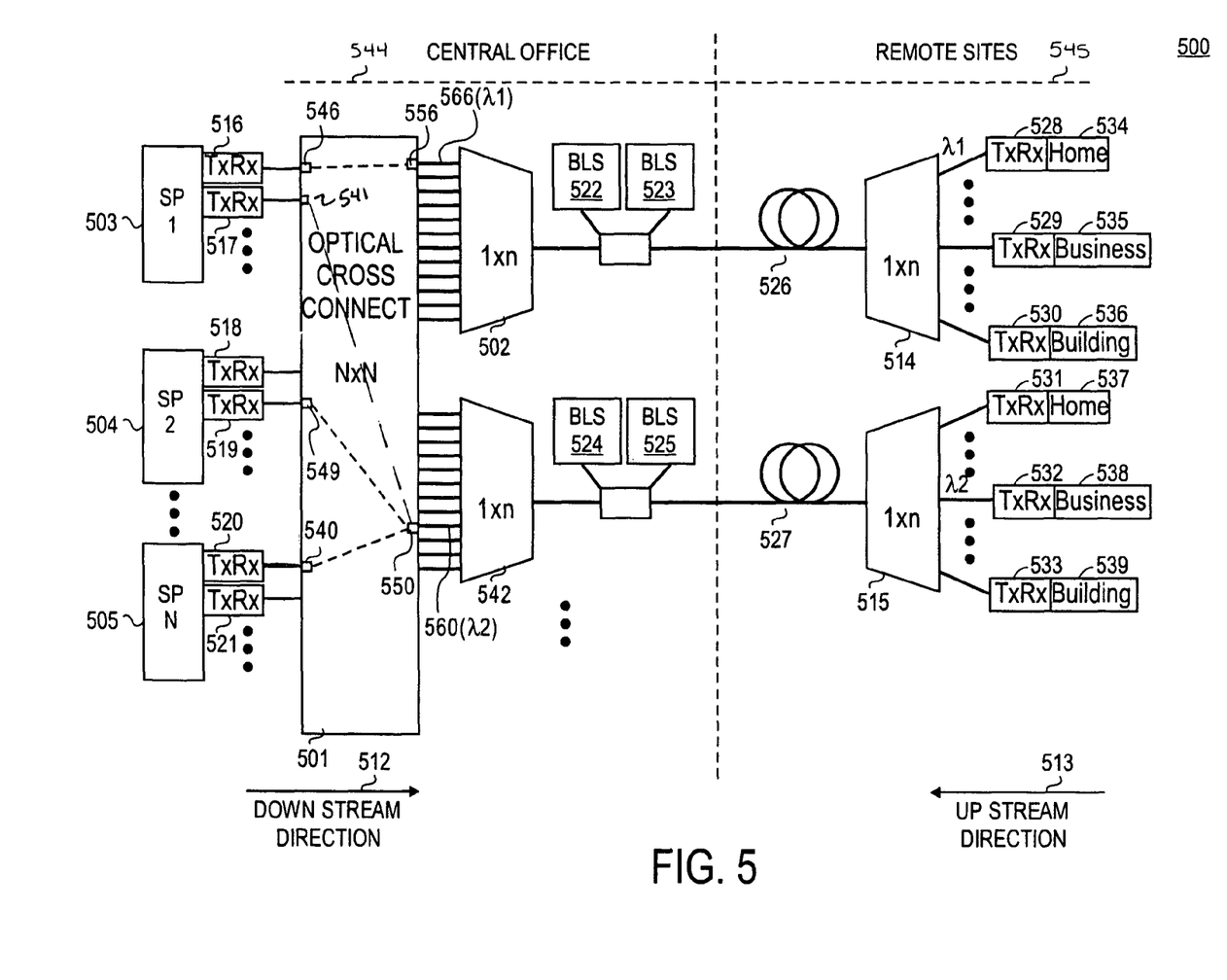
FIG. 5 shows one embodiment of a system that connects a plurality of service providers to a plurality of remote users over a WDM PON.

FIG. 5 shows one embodiment of a system 500 that connects a plurality of service providers to a plurality of remote users over a WDM PON. As shown in FIG. 5, a WDM PON of system 500 includes an N×N optical cross-connect 501, one or more WDM MUX/DeMUXes located in a central office location 544 that are connected to one or more WDM MUX/DeMUxes located at remote sites 545 by one or more optical fibers. As shown in FIG. 5, service providers SP1, SP2, SPN are connected to respective WDM transceivers 516-521 to provide optical communication through the WDM PON to WDM transceivers 528-533 connected to respective remote users 534-539. For one embodiment, service providers SP1-SPN connected to transceivers 516-521 are located at central office 544. For another embodiment, service providers SP1-SPN connected to transceivers 516-521 are located at a distance from the central office 544. Each of the transceivers 516-521 has a transmitter Tx to generate a set of one or more optical signals to transmit in down stream direction 512 and a receiver Rx to receive a set of one or more optical signals transmitted in up stream direction 513. For one embodiment, each of the transceivers 516-521 includes a wavelength-locked light source, a wavelength specific light source, or any combination thereof.

Figure 8:
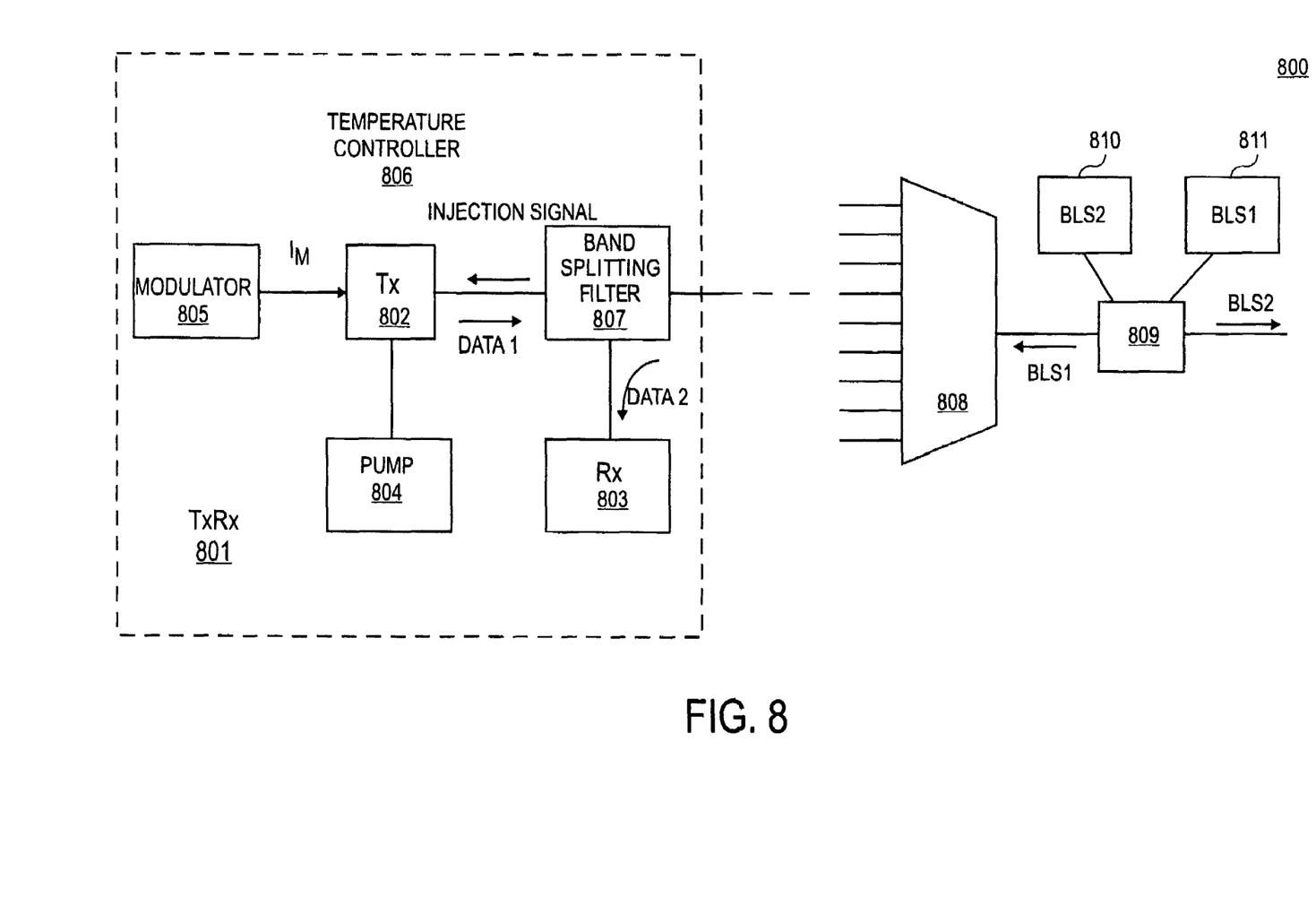
FIG. 8 shows one embodiment of a transceiver.

FIG. 8 shows one embodiment of a transceiver. As shown in FIG. 8, transceiver 801 includes a transmitter 802 to transmit a set of one or more optical signals in one direction (DATA 1), and a receiver 803 to receive a set of one or more optical signals transmitted in another direction (DATA 2). A band splitting filter 807 coupled to transmitter 802 and receiver 803 is configured to optically separate the set of one or more optical signals of one wavelength band traveling in one direction (DATA 1) from the set of one or more optical signals of another wavelength band traveling in another direction (DATA 2). Transmitter 802 is connected to a gain pump 804 and a data modulator 805, as shown in FIG. 8. Gain pump 804 supplies a bias current to transmitter 802. The bias current cooperates with a current signal $I_M$ provided by data modulator 805 to generate from the transmitter 801 the set of one or more optical signal ("Data 1), as shown in FIG. 8. Transmitter 802 may include a wavelength-locked light source, a wavelength specific light source, or any combination thereof. The wavelength-specific light source may be a Distributed Feed-Back ("DFB") laser, DBR laser (Distributed Bragg Reflector) laser, a tunable laser, or any other optical transmitter configured to transmit a repeatable specific wavelength with enough power to transmit at a high data speed, e.g., 125 Megabits per second ("Mbps"), 155 Mbps, 622 Mbps, 1.25 Gigabits per second ("Gbps"), 2.5 Gbps, 10 Gbps, or 40 Gbps. A tunable laser may be a tunable external cavity laser, a semiconductor laser having the wavelength tuned by a temperature controller, and the like. The wavelength-locked light source may include a Fabry-Perot laser diode, a Reflective Semiconductor Optical Amplifier ("RSOA"), or other similar optical transmitter configured to operate below a lasing threshold when being suppressed by an injected spectral light signal.

For one embodiment, transceiver 801 having a wavelength locked light source is configured to transmit optical signals (DATA 1) from a wavelength-locked light source of transmitter 802, and to receive injection optical signals from a broadband light source ("BLS") 811 into the wavelength-locked light source of transmitter 802, as shown in FIG. 8. For one embodiment, transceiver 801 having a wavelength-locked light source has non-reciprocal circulators. Non-reciprocal circulators are known to one of ordinary skill in art of telecommunications.

As shown in FIG. 8, a broadband optical signal BLS1 is transmitted through an optical coupler 809 to a WDM MUX/De-MUX 808. WDM MUX/De-MUX spectrally slices the incoming signal from broadband source 811 to provide the injection optical signals to lock an output wavelength of transmitter 802. As shown in FIG. 8, broadband light source 811 supplies broadband optical signals BLS1 of one wavelength band to transceiver 801 in one direction, and broadband light source 810 supplies through optical coupler 809 broadband optical signals BLS2 of another wavelength band in another direction to another transceiver (not shown) at a remote site. Examples of wavelength bands may be C-band (1530 nm~1560 nm), E-band (1420 nm~1450 nm), L-band (1570 nm~1600 nm), O-band (1300 nm~1330 nm), S-band (1490 nm ~1520 nm), and the like. For one embodiment, each of broadband light sources 810 and 811 includes an Erbium Doped Fiber Amplifier ("EDFA").

Referring back to FIG. 5, for one embodiment, all transceivers 516-521 at central office are interchangeable transceivers that allows any service provider to use a common transceiver that can communicate with any remote user, independent of the optical path to the remote user. For one embodiment, all DWDM transceivers 516-521 connected to service providers SP1-SPN have wavelength-locked light sources. For another embodiment, all DWDM transceivers 516-521 connected to service providers SP1-SPN have identical wavelength specific light sources, e.g., tunable lasers.

Optical cross-connect 501 has N optical inputs and N optical outputs. Optical cross-connect 501 connects any of N outputs to any of N inputs, so that any of N outputs of cross-connect 501 can be connected to any of transceivers 516-521. For one embodiment, optical cross-connect 501 includes an N×N optical switch, e.g., an N×N Micro Electro-Mechanical Structures ("MEMS") optical switch. For another embodiment, cross-connect 501 includes an optical fiber patch panel, where an operator can physically make the connection between the service provider and a WDM-MUX/De-MUX. For yet another embodiment, cross-connect 501 is replaced by a direct fiber connection between a service provider and one or more WDM-MUX/De-MUXes in central office 544. Because service providers SP1, SP2, . . . SPN communicate to optical cross-connect 501 through optical fibers, they are not restricted by bandwidth-distance limitations that may occur when using copper wire connections.

For one embodiment, each of the service providers SP1-SPN provides a set of one or more electrical signals to a respective transceiver. Each of the transceivers 516-521 generates a set of one or more optical signals that carry the data from a respective service provider. Each of the transceivers generates a set of one or more optical signals at a specific wavelength. The sets of optical signals generated by transceivers 516-521 are received by respective inputs of optical cross-connect 501. Optical cross-connect 501 sends each set of the optical signals to a respective output. As shown in FIG. 5, one or more WDM multiplexers/De-multiplexers 502 and 542 are coupled to cross-connect 501 so that the wavelength channels of the WDM MUX/De-MUX are connected to outputs of cross-connect 501, as shown in FIG. 5. The sets of one or more optical signals are transmitted from transceivers 516-521 through wavelength channels of WDM MUX/DeMUX 502 and WDM MUX/DeMUX 542.

For one embodiment, all interchangeable transceivers 516-521 are identical transceivers operating at different wavelengths. Interchangeable transceivers 516-521 can be connected by optical cross-connect 501 to any of wavelength channels of WDM MUX/De-MUX 502 and 542. Optical signals from any of transceivers 516-521 coupled to the respective service provider SP1, SP2, or SPN can be transmitted to any wavelength channel of any WDM MUX/De-MUX 502 and 542 by using the cross-connect 501 and setting a wavelength of the transceiver. For one embodiment, the wavelength of the transceivers 516-521 is tuned automatically. For one embodiment, switching of cross-connect 501 to a wavelength channel of the MUX/De-MUX automatically sets the wavelength of any of the wavelength-locked light sources of transceivers 516-521 to transmit through this wavelength channel. Switching of cross-connect 501 to a specific wavelength channel of the MUX/De-MUX automatically provides a spectrally sliced injection signal from broadband source 523 or 525 to the wavelength-locked light source. The spectrally sliced injection signal causes the wavelength-locked light source, e.g., Fabry-Perot laser, and Reflective Semiconductor Optical Amplifier ("RSOA"), to operate at the wavelength of this specific wavelength channel. That is, by switching the wavelength channel of the WDM MUX/De-MUX to the transceiver, the wavelength of the wavelength-locked light source of the transceiver is set automatically without using any feedback circuitry. For another embodiment, in response to switching to a specific wavelength channel of the MUX/De-MUX, the operating wavelength of the transceiver is tuned automatically by tuning the wavelength of a tunable laser.

As shown in FIG. 5, WDM multiplexers/De-multiplexers 502 and 542 multiplex the optical signals carrying data from service providers SP1, SP2, SPN to transmit through optical fibers 526 and 527 in down stream direction 512 to transceivers 528-533, as shown in FIG. 5. WDM multiplexers/De-multiplexers 502 and 542 de-multiplex the optical signals in up stream direction 513 from transceivers 528-533, as shown in FIG. 5. Each of the transceivers 528-533 is connected to a remote user, as shown in FIG. 5. The remote users may be located at home, business, building, and any other place, as shown in FIG. 5. For one embodiment, all transceivers 528-533 at remote sites are interchangeable WDM transceivers that are designed to be identical. Providing interchangeable WDM transceivers significantly reduces the installation and management costs of the remote sites. For one embodiment, all transceivers at central office 544 include wavelength-locked transmitters operating in one wavelength band, e.g., E-band, and all transceivers at remote sites 545 include wavelength-locked transmitters operating in another wavelength band, e.g., C-band. For another embodiment, the transceivers at central office 544 operate at any of wavelength bands, e.g., C-band, E-band, L-band, S-band, O-band, and the like. For another embodiment, the transceivers at remote sites 545 operate at any of the wavelength bands, e.g., C-band, E-band, L-band, S-band, O-band, and the like. For one embodiment, transceivers at central office 544 and transceivers at remote sites 545 are small form factor pluggable ("SFP") modules that can be easily inserted into the output ports of an electrical switch owned by the service provider. For one embodiment, each of service providers SP1, SP2, . . . SPN has an Ethernet switch (503, 504, and 505) that can service multiple subscribers. As a new subscriber signs up, an additional SFP transceiver is inserted into an unused output slot of the Ethernet switch of the service provider.

As shown in FIG. 5, transceiver 516 connected to an output slot of Ethernet switch 503 of SP1 transmits the set of one or more optical signals having a wavelength $\lambda 1$ through input 546 to output 556 of cross-connect 501. Output 556 is connected to a wavelength channel 566 of WDM MUX/De-MUX 502 that transmits optical signals having wavelength $\lambda 1$. Optical signals having wavelength $\lambda 1$ are received by transceiver 528 to provide data to remote user 534. As shown in FIG. 5, cross-connect 501 transmits the optical signals having a wavelength $\lambda 2$ from transceiver 520 through input 540 to output 550. Output 550 is connected to a wavelength channel 560 of WDM MUX/De-MUX 542 that transmits optical signals having wavelength $\lambda 2$. Optical signals having wavelength $\lambda 2$ are received by transceiver 532 to provide data to remote user 538, as shown in FIG. 5.

For one embodiment, service provider SPN that supplies data to remote user 538 can be automatically replaced with service provider SP1 by switching transceiver 517 of service provider SP1 to wavelength channel 560 using optical cross-connect 501, as shown in FIG. 5. That is, optical cross-connect 501 switches connection of wavelength channel 560 from input 540 to input 541 that is connected to transceiver 517 of service provider SP1, as shown in FIG. 5. The operating wavelength of transceiver 517 is automatically tuned to wavelength $\lambda 2$ by switching to wavelength channel 560, as described above.

For one embodiment, service provider SPN that supplies data to remote user 538 can be automatically replaced with service provider SP2 by switching transceiver 519 of service provider SP2 to wavelength channel 560 using optical cross-connect 501, as shown in FIG. 5. That is, optical cross-connect 501 switches connection of wavelength channel 560 from input 540 to input 549 that is connected to transceiver 519 of service provider SP2, as shown in FIG. 5. The operating wavelength of transceiver 519 is automatically tuned to wavelength $\lambda 2$ by switching to wavelength channel 560, as described above.

As shown in FIG. 5, WDM MUX/De-MUX 514 and WDM MUX/De-MUX 515 are used to de-multiplex the optical signals transmitted from service providers SP1, SP2 . . . SPN in down stream direction 512 through fibers 526 and 527 and to multiplex the optical signals in up steam direction 513 from transceivers 528-533 that are connected to remote users 534-539.

For one embodiment, WDM MUX/De-MUXes 502, 542, 514, and 515 include Arrayed Waveguide Grating ("AWG") Multiplexers/Demultiplexers. For another embodiment, WDM MUX/De-MUXes 502, 542, 514, and 515 include thin film dielectric filters. For one embodiment, each of WDM MUX/De-MUXes 502, 542, 514, and 515 has the optical spacing between adjacent optical channels in the approximate range of 10 GHz to 200 GHz.

For an embodiment, each of WDM MUX/De-MUXes 502, 542, 514, and 515 is a cyclic AWG that has a free spectral range ("FSR") to multiplex/de-multiplex light having wavelengths in the approximate range of 1300 nm to 1650 nm. For one embodiment, at least one of the wavelength channels of the AWG MUX/De-MUXes 502, 542, 514, and 515 transmits multiple wavelengths from multiple wavelength bands, e.g., 2 to 7 wavelengths from 2-7 wavelength bands, at the same time.

For one embodiment, each of the wavelength channels of AWG MUX/De-MUX transmits wavelengths from at least E-band and C-band in the same time providing bi-directional data communication. For one embodiment, the MUX/DMUXes 502, 542, 514, and 515 have the spacing between optical channels less than 10 nm. For one embodiment, WDM-MUX/De-MUXes 502, 542, and 514, 515 are matched AWG MUX/De-MUXes. For one embodiment, the wavelength of WDM MUX/De-MUX channels does not significantly change with the temperature. That is, each of the WDM-MUX/De-MUXes 502, 542, and 514, 515 is temperature insensitive ("athermal"), and does not need an active temperature control. Athermal WDM-MUX/De-MUXes are known to one of ordinary skill in the art of telecommunications.

For one embodiment, the management of configuring remote users with different service providers, including the maintenance of the system 500 including outside fiber plant, the cross-connects, the WDM-MUX De-MUXes, and the broadband sources can be handled by a single entity, e.g., Municipality, Utility, e.g., PG&E or a private company hired by a local government.

Figure 6:
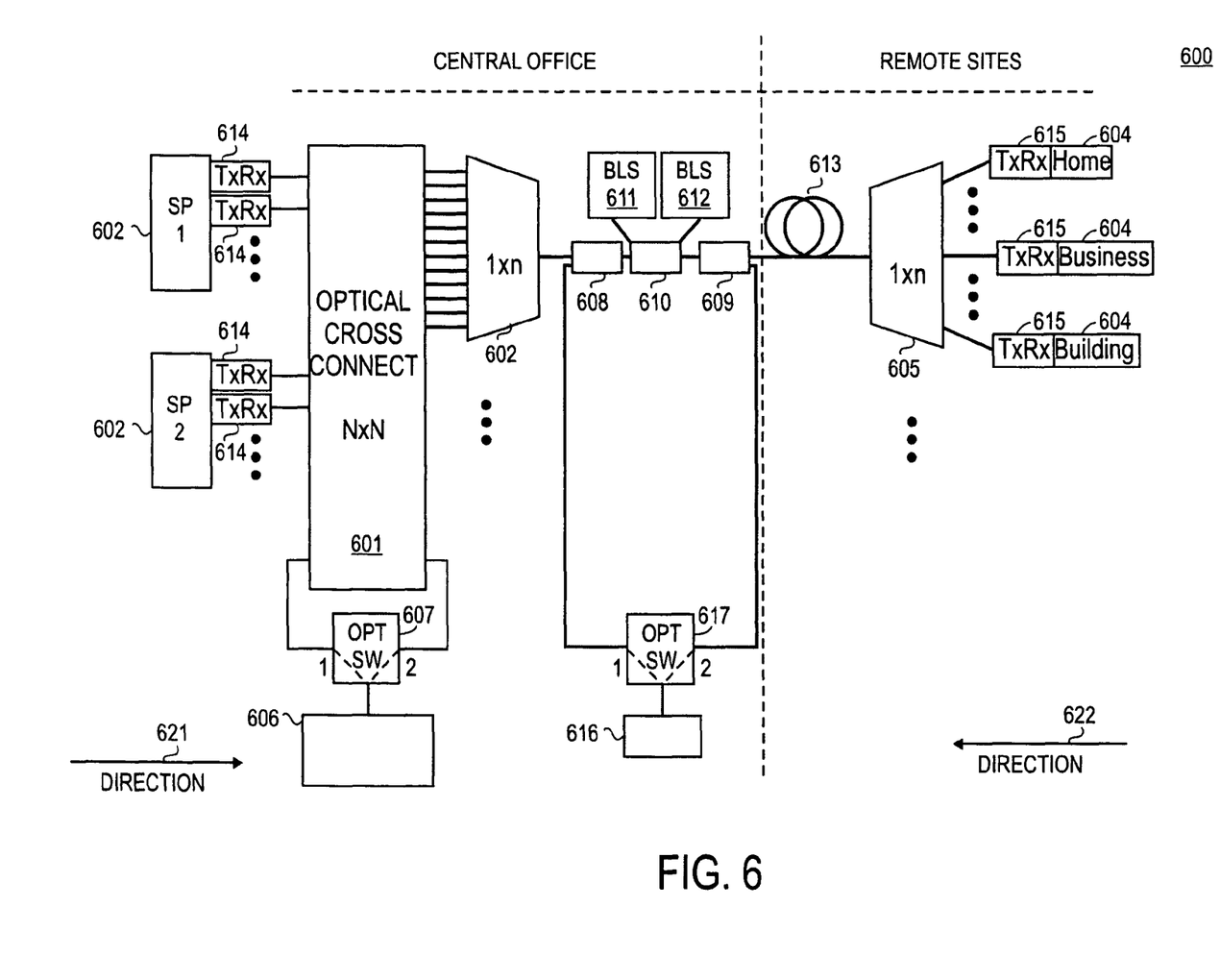
FIG. 6 shows one embodiment of a WDM PON for "Open Access" services that that has system diagnostics.

FIG. 6 shows one embodiment of a WDM PON for "Open Access" services that that has system diagnostics. As shown in FIG. 6, system 600 includes an N×N optical cross-connect 601, a WDM MUX/DeMUX 602 located at a central office and connected to WDM MUX/DeMUX 605 located at remote sites by an optical fiber 613. As shown in FIG. 6, service providers SP1 and SP2 are connected to WDM transceivers 614 to provide optical communication through the WDM PON to WDM transceivers 615 connected to remote users 604. For one embodiment, each of the transceivers 614 and 615 includes a wavelength-locked light source, a wavelength specific light source, or any combination thereof. For one embodiment, transceivers 614 are interchangeable transceivers. For one embodiment, transceivers 615 are interchangeable transceivers.

Optical cross-connect 601 has N optical inputs and N optical outputs. Optical cross-connect 601 connects any of N outputs to any of N inputs, so that any of N outputs of cross-connect 601 can be connected to any of transceivers 614. For one embodiment, optical cross-connect 601 includes an N×N optical switch, e.g., an N×N Micro Electro-Mechanical Structures ("MEMS") optical switch. For another embodiment, optical cross-connect 601 includes an optical fiber patch panel, where an operator can physically make the connection between the service provider and the WDM-MUX/De-MUX.

As shown in FIG. 6, WDM multiplexers/De-multiplexer 602 multiplexes the optical signals carrying data from service providers SP1 and SP2 to transmit through optical fiber 613 in down stream direction 621 to transceivers 615 connected to remote users 604, as shown in FIG. 6. WDM multiplexers/De-multiplexer 605 multiplexes the optical signals in upstream direction 622 from transceivers 615, as shown in FIG. 5. For one embodiment, all transceivers 615 are interchangeable WDM transceivers. For one embodiment, service providers SP1 and SP2 have Ethernet switches 602 that can service multiple subscribers. As shown in FIG. 6, a monitoring unit 606 is connected to optical cross-connect 601 through 1×2 optical switch 607 to provide a system diagnostics, e.g., to monitor the integrity of each of the optical links between each of the service providers and each of the remote users. Monitoring unit 606 is configured to measure the optical link loss and connectivity between a service provider and a remote user. In one embodiment, monitoring unit is a WDM Optical Time Domain Reflectometer ("OTDR") that measures the optical losses as a function of fiber distance along any wavelength channel to monitor the integrity of the optical links. By measuring the optical losses as a function of the fiber distance the physical location of fiber breaks and locations where undesired transmission losses occur is identified. For one embodiment, wavelength tunable WDM monitoring unit 606 sends an optical pulse having a wavelength, e.g., in L-band (around 1586 nm) along an optical link, e.g., an optical fiber. The optical pulse scatters back from all the scatters along the optical link. Wavelength tunable WDM OTDR monitoring unit 606 integrates all scattered light to measure a reflected optical power versus the length of the optical link. That is, wavelength tunable WDM OTDR monitoring unit 606 monitors the complete optical path to an individual remote user from the central office providing a substantial operational cost savings.

For one embodiment, transceivers 614 at the central office include wavelength-locked transmitters operating in a first wavelength band, e.g., E-band, and all transceivers 615 at remote sites include wavelength-locked transmitters operating in a second wavelength band, e.g., C-band, and monitoring unit 606 operates in a third wavelength band, e.g., L-band. For another embodiment, transmitters 614 at the central office operate in any of wavelength bands, e.g., C-band, E-band, L-band, S-band, O-band, and the like. For another embodiment, transmitters 615 at the remote sites operate at any of the wavelength bands, e.g., C-band, E-band, L-band, S-band, O-band, and the like. For yet another embodiment, monitoring unit 606 operates at any of the wavelength bands, e.g., C-band, E-band, L-band, S-band, O-band, and the like.

For one embodiment, wavelength tunable WDM monitoring unit 606 monitors the integrity of each of the optical links between any of transceivers 614 connected to the service providers and the optical cross-connect 601 when switch 607 is in a second position (2), as shown in FIG. 6. Placing switch 607 in the second position (2) connects monitoring unit 606 to any of inputs of N×N optical cross-connect 601 to connect to any of the service providers 602. Monitoring unit 606 monitors the integrity of each of the optical links between any of the remote users 604 and optical cross-connect 601 when switch 607 is in a first position (1), as shown in FIG. 6. Placing switch 607 in the first position (1) connects monitoring unit 606 to any of outputs of N×N optical cross-connect 601 to connect to any of the wavelength channels of remote users 604. That is, a single monitoring unit 606 at a central office is configured to monitor the integrity of each of the optical links in directions 621 and 622. For one embodiment, a single monitoring unit 606 may be used with one or more optical cross-connects, one or more first WDM MUX-De-MUXes 602 at the central office that are connected to one or more second WDM MUX-De-MUXes 605 at remote sites through one or more optical fibers 613.

For one embodiment, monitoring unit 606, e.g., an OTDR, includes one or more pulsed tunable lasers, or a plurality of other wavelength specific sources, e.g., DFB lasers, to measure optical losses along a plurality of wavelength channels. For another embodiment, monitoring unit 606, e.g., an OTDR, includes a wavelength-swept laser source that does not require the laser being pulsed.

As shown in FIG. 6, another monitoring unit 616 at central office that is coupled to MUX/De-MUX 602 and to MUX/De-MUX 605 to monitor optical power levels of the optical signals transmitted in direction 621 and in direction 622. As shown in FIG. 6, optical tap 608 and optical tap 609 are placed at each side of an optical coupler 610. As shown in FIG. 6, optical coupler 610 is used to inject broadband signals from broadband source 611 and broadband source 612 into optical feeder fiber 613. A small portion the optical signals in down stream direction 621 is tapped using optical tap 608 and small portion of the optical signals in up stream direction 622 is tapped using optical tap 609. Monitoring unit 616 measures optical power of these small tapped portions of the optical signals as a function of a wavelength to determine optical power levels of the optical signals transmitted in directions 621 and 622 along each of the wavelength channels. For one embodiment, monitoring unit 616 is configured to monitor the optical power levels along wavelength channels to ensure that each of the transceivers from service providers and from remote users delivers a required optical power level. For another embodiment, monitoring unit 616 is configured to monitor the optical power levels from each of the broadband sources 611 and 612 to ensure that that the BLS optical power level for each of the wavelength channels is in the correct optical power level range. For one embodiment, monitoring unit 616 is configured to measure optical power as a function of wavelength. For one embodiment, monitoring unit 616 includes an Optical Spectrum Analyzer ("OSA"). As shown in FIG. 6, an 1× M optical switch 617 is placed between monitoring unit 616 and taps 608 and 609. For one embodiment, monitoring unit 616 monitors the optical power of the optical signals transmitted in direction 621 when switch 617 is in a first position. For one embodiment, monitoring unit 616 monitors the optical power of the optical signals transmitted in direction 622 when switch 617 is in a second position. For one embodiment, 1×M switch 617 provides a single monitoring unit 616 per a central office to monitor optical power levels along each of the wavelength channels in different directions from service providers, remote users, and from broadband sources. For one embodiment, 1×M optical switch 617 provides a single monitoring unit 616 per a central office to monitor multiple WDM PONs and to toggle between up stream signals and down stream signals. For one embodiment, monitoring unit 616 includes tunable diffraction gratings, scanning etalon filters, detector arrays connected to AWGs, and the like.

For one embodiment, the connectivity of an optical link is checked by monitoring unit 606, and then determining an optical power level in this optical link is performed by monitoring unit 616. For one embodiment, the connectivity of each of the optical links (wavelength channels) is dynamically checked by monitoring unit 606 in time. For one embodiment, the power level along each of the wavelength channels is dynamically checked by monitoring unit 616 in time.

For one embodiment, a single monitoring unit 616 may be used with one or more optical cross-connects, one or more first WDM MUX-De-MUXes 602 at the central office that are connected to one or more second WDM MUX-De-MUXes 605 at remote sites through one or more optical fibers 613.

As shown in FIG. 6, by using monitoring unit 606 with automated optical switch 607 and monitoring unit 616 with automated optical switch 617, the complete set of optical properties of the WDM-PON access system 600 is quickly and efficiently monitored from the central office without human intervention.

Figure 7:
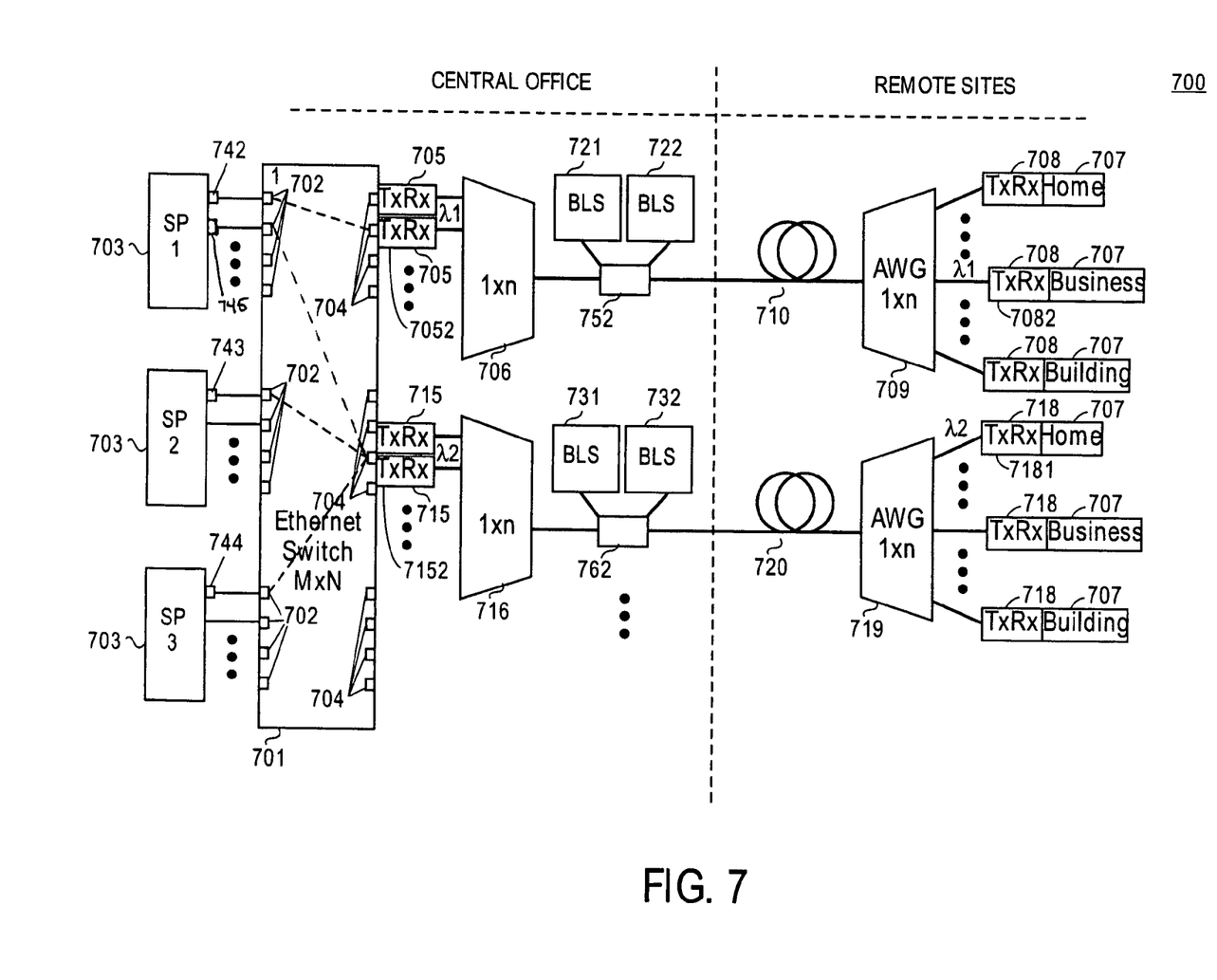
FIG. 7 shows another embodiment of a system that connects a plurality of service providers to a plurality of remote users over a WDM PON.

FIG. 7 shows another embodiment of a system 700 that connects a plurality of service providers to a plurality of remote users over a WDM PON. As shown in FIG. 7, system 700 includes an M×N electrical switch 701, one or more WDM MUX/DeMUXes 706 and 716 located at a central office and connected to one or more WDM MUX/DeMUXes 709 and 719 located at remote sites by one or more optical fibers 710 and 720. M×N electrical switch 701 provides connection between any of M inputs 702 to any of N outputs 704 so that any of N outputs of electrical switch 701 can be connected to any of transceivers 705 and 715. As shown in FIG. 7, service providers SP1, SP2, and SP3 are electrically connected to inputs 702 of electrical switch 701, e.g., using CAT-5, RJ45 connectors, and cables.

Electrical switch 701 has outputs 704 connected to WDM transceivers 705 and 715 to provide optical communication through a WDM PON that includes MUX/De-MUXes 706 and 716, optical fibers 710 and 720, MUX/De-MUXes 709 and 719 to WDM transceivers 708 and 718 connected to remote users 707. For one embodiment, each of the transceivers 705, 715, 708, and 718 includes a wavelength-locked light source, a wavelength specific light source, or any combination thereof, as described above. For one embodiment, transceivers 705 and 715 are interchangeable transceivers. For one embodiment, transceivers 708 and 718 are interchangeable transceivers. For one embodiment, electrical M×N switch includes an M×N Ethernet switch.

As shown in FIG. 7, WDM Multiplexers/De-multiplexers 706 and 716 multiplex the optical signals carrying data from service providers SP1, SP2, and SP3 to transmit through optical fibers 710 and 720 in down stream direction to transceivers 708 and 718 connected to remote users 707, as shown in FIG. 7. WDM Multiplexers/De-multiplexers 709 and 719 de-multiplex the optical signals in up stream direction from transceivers 708 and 718, as shown in FIG. 7. For one embodiment, all transceivers 705 and 715 at the central office include wavelength-locked transmitters operating in one wavelength band, e.g., E-band, and all transceivers 708 and 718 at remote sites include wavelength-locked transmitters operating in another wavelength band, e.g., C-band. For another embodiment, transceivers 705 and 715 at the central office operate in any of wavelength bands, e.g., C-band, E-band, L-band, S-band, O-band, and the like. For another embodiment, transceivers 708 and 718 at the remote sites operate at any of the wavelength bands, e.g., C-band, E-band, L-band, S-band, O-band, and the like. For one embodiment, service providers SP1, SP2, and SP3 have Ethernet switches 703 that service multiple subscribers.

As shown in FIG. 7, an output 742 of the Ethernet switch 703 of service provider SP1 is connected to a first (1) of the inputs 702 of electrical M×N switch 701. As shown in FIG. 7, a transceiver 7052 of transceivers 705 is electrically connected through the M×N switch 701 to output 742 of SP1 to receive electrical data. Transceiver 7052 converts electrical data to a set of one or more optical signals having a wavelength λ1 to transmit to one of the wavelength channels of WDM MUX/De-MUX 706. The set of one or more optical signals having wavelength λ1 is received by a transceiver 7082 of transceivers 708 to provide data to one of remote users 707, as shown in FIG. 7. As shown in FIG. 7, a transceiver 7152 of transceivers 715 is electrically connected through the M×N switch 701 to output 743 of SP2 to receive another electrical data. Transceiver 7152 converts electrical data to a set of one or more optical signals having a wavelength λ2 to transmit to one of the wavelength channels of WDM MUX/De-MUX 716. The set of one or more optical signals having wavelength λ2 is received by transceiver 7181 of transceivers 718 to provide data to another of the remote users 707, as shown in FIG. 7.

For one embodiment, service provider SP2 that supplies data to another of the remote users 707 can be automatically replaced with service provider SP1 by switching transceiver 7152 to service provider SP1 using electrical switch 701, as shown in FIG. 7. As shown in FIG. 7, transceiver 7152 is electrically switched using M×N switch 701 to output 745 of SP1 to receive electrical data. Transceiver 7152 converts electrical data to a set of one or more optical signals having a wavelength λ2 to transmit to one of the wavelength channels of WDM MUX/De-MUX 706. The set of one or more optical signals having wavelength λ2 is received by transceiver 718 to provide data to the remote user, as shown in FIG. 7.

For another embodiment, service provider SP2 that supplies data to another of the remote users 707 can be automatically replaced with service provider SP3 by switching transceiver 7152 to service provider SP3 using electrical switch 701, as shown in FIG. 7. As shown in FIG. 7, transceiver 7152 is electrically switched using M×N switch 701 to output 744 of SP3 to receive electrical data. Transceiver 7152 converts electrical data to a set of one or more optical signals having a wavelength λ2 to transmit to one of the wavelength channels of WDM MUX/De-MUX 706. The set of one or more optical signals having wavelength λ2 is received by transceiver 7181 to provide data to the remote user, as shown in FIG. 7.

As shown in FIG. 7, WDM MUX/De-MUX 709 and WDM MUX/De-MUX 719 are used to de-multiplex the optical signals transmitted from service providers SP1, SP2 . . . SP3 in down stream direction through fibers 710 and 720 and to multiplex the optical signals in up steam direction from transceivers 708 and 718 that are connected to remote users 707.

For one embodiment, WDM MUX/De-MUXes 706, 716, 709, and 719 include Arrayed Waveguide Grating ("AWG") Multiplexers/Demultiplexers. For another embodiment, WDM MUX/De-MUXes 706, 716, 709, and 719 include thin film dielectric filters. For one embodiment, WDM MUX/De-MUXes 706, 716, 709, and 719 have the optical spacing between adjacent optical channels in the range of 10 GHz-200 GHz.

For an embodiment, each of WDM MUX/De-MUXes 706, 716, 709, and 719 is a cyclic AWG that has a free spectral range ("FSR") to multiplex/de-multiplex light having wavelengths in the approximate range of 1420 nm to 1650 nm. For one embodiment, each of the wavelength channels of the AWG MUX/De-MUXes 706, 716, 709, and 719 transmits wavelength from multiple wavelength bands, e.g., 2-7 wavelength bands, in the same time. For one embodiment, each of the wavelength channels of AWG MUX/De-MUX transmits wavelengths from at least E-band and C-band in the same time providing bi-directional data communication. For one embodiment, the MUX/DMUXes 706, 716, 709, and 719 have the spacing between optical channels less than 10 nm. For one embodiment, WDM-MUX/De-MUXes 706, 716, 709, and 719 are matched AWG MUX/De-MUXes. For one embodiment, each of the WDM MUX/De-MUXes 706, 716, 709, and 719 is temperature insensitive.

As shown in FIG. 7, broadband light source 722 is coupled to WDM-MUX/De-MUX 706 through optical coupler 752 to provide injection signals to at least one of the transceivers 705. As shown in FIG. 7, broadband light source 732 is coupled through optical coupler 762 to WDM-MUX/De-MUX 716 to provide injection signals to at least one of the transceivers 715. As shown in FIG. 7, broadband light source 721 is coupled to WDM-MUX/De-MUX 709 to provide injection signals to at least one of the transceivers 708 at remote sites. As shown in FIG. 7, broadband light source 731 is coupled to WDM-MUX/De-MUX 719 to provide injection signals to at least one of the transceivers 718 at remote sites.

For one embodiment, system 700 includes a first monitoring unit to monitor the integrity of each of the optical links, as described above with respect to FIG. 6. For one embodiment, system 700 includes a second monitoring unit to monitor an optical power of each of the optical links, as described above with respect to FIG. 6. For one embodiment, electrical M×N switch 701 determines a data rate, e.g., 125 Megabits per second ("Mbps"), 155 Mbps, 622 Mbps, 1.25 Gigabits per second ("Gbps"), 2.5 Gbps, 10 Gbps, or 40 Gbps, for communication between each of service providers SP1-SP3 and each of the remote users 707.

For one embodiment, transceivers 708 and 718 at the remote sites can be connected to various individual hardware components for converting services, e.g., voice, and video into data compatible with the modem, e.g., Ethernet data packets. These hardware components can be rented out by the service provider or purchased by the remote user. For another embodiment, transceivers 708 and 718 at the remote sites include components that convert voice, and video into data compatible with the modem.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. An apparatus, comprising:
a first transceiver comprising a first wavelength-locked light source to generate a first set of optical signals corresponding to a first service provider and a second transceiver comprising a second wavelength-locked light source to generate a second set of optical signals corresponding to a second service provider, wherein each of the first wavelength-locked light source and the second wavelength-locked light source includes one of a Fabry-Perot laser diode, a Reflective Semiconductor Optical Amplifier ("RSOA"), and other optical transmitter configured to operate below a lasing threshold when being suppressed by an injected spectral light signal;
a cross-connect coupled to the first transceiver and the second transceiver, the cross-connect having a first input connected to the first wavelength-locked light source associated with the first service provider and a second input connected to the second wavelength-locked light source associated with the second service provider, the cross-connect having a first output and a second output, wherein the cross-connect is configured to connect any of the inputs with any of the outputs, wherein the cross-connect is configured to receive at the first input the first set of optical signals corresponding to the first service provider and to receive at the second input the second set of optical signals corresponding to the second service provider transmitted in a first direction;
a first wavelength division multiplexing ("WDM") multiplexer/de-multiplexer having a first wavelength channel and a second wavelength channel coupled to the cross-connect to multiplex the first set and the second set of the optical signals to transmit to a remote location in the first direction, the cross-connect is to supply the first set to the first wavelength channel and to supply the second set to the second wavelength channel, and a broadband light source coupled to the first multiplexer/de-multiplexer to transmit an injection signal to the cross-connect, wherein the cross-connect is configured to receive the injection signal from the broadband light source and a third set of optical signals from a first remote user at the first output, wherein the injection signal from the broadband light source and the third set of optical signals from the first remote user are transmitted through one of the optical cross-connect outputs to the first input in a second direction opposite to the first direction, wherein the cross-connect is configured to switch the transmission of the injection signal and the third set of optical signals through the one of the optical cross-connect outputs to the second input to switch a wavelength of the second set of optical signals corresponding to the second service provider to a wavelength channel of the third set of optical signals of the first remote user to automatically switch an optical connection of the first remote user from the first service provider to the second service provider;
a first switch having a first port to connect to the one of the optical cross-connect inputs, and a second port to connect to one of the optical cross-connect outputs;
a first monitoring unit connected to the first switch to monitor the integrity of optical links between service providers and the cross-connect when the first switch is in a first position, and wherein the first monitoring unit monitors the integrity of optical links between remote users and the optical cross-connect when the first switch is in a second position;
a second switch connected between the first WDM multiplexer/de-multiplexer and a second multiplexer/de-multiplexer at the remote location;
and a second monitoring unit connected to the second switch, wherein the second monitoring unit monitors the optical power of the optical signals transmitted in the first direction when the second switch is in a first position, and wherein the second monitoring unit monitors the optical power of the optical signals transmitted in the second direction when the second switch is in a second position.

2. The apparatus of claim 1, wherein the cross-connect includes an NxN optical switch.

3. The apparatus of claim 1, wherein the cross-connect includes an optical fiber patch panel.

4. The apparatus of claim 1, wherein the first multiplexer/de-multiplexer is temperature insensitive.

5. The apparatus of claim 1, wherein the first multiplexer/de-multiplexer has at least one wavelength channel that carries wavelengths from multiple wavelength bands.

6. The apparatus of claim 1, further comprising
a second WDM multiplexer/de-multiplexer at the remote location coupled to the first multiplexer/de-multiplexer to de-multiplex the first set and the second set to supply the first set to a first remote user through a third wavelength channel and to supply the second set to a second remote user through a fourth wavelength channel.

7. The apparatus of claim 1, further comprising a third transceiver including a wavelength specific light source coupled to the cross-connect.

8. The apparatus of claim 1, wherein the first transceiver and the second transceiver are alike.

9. A system, comprising:
an optical cross-connect to receive first optical signals at optical cross-connect inputs including a first input connected to a first wavelength-locked light source associated with a first one of a first plurality of service providers and a second input connected to a second wavelength-locked light source associated with a second one of the first plurality of service providers wherein the first optical signals are transmitted in a first direction, wherein each of the first wavelength-locked light source and the second wavelength-locked light source includes one of a Fabry-Perot laser diode, a Reflective Semiconductor Optical Amplifier ("RSOA"), and other optical transmitter configured to operate below a lasing threshold when being suppressed by an injected spectral light signal;

a first WDM multiplexer/de-multiplexer coupled to the optical cross-connect to multiplex the first optical signals transmitted to a second plurality of remote users in the first direction and to de-multiplex second optical signals transmitted from the second plurality of the remote users in a second direction opposite to the first direction;

a broadband light source coupled to the first multiplexer/de-multiplexer to transmit an injection signal to the optical cross-connect, wherein the optical cross-connect is configured to receive the injection signal from the broadband light source and a set of the second optical signals from a first remote user at the first output, wherein the injection signal from the broadband light source and the set of the second optical signals from the first remote user are transmitted through one of the optical cross-connect outputs to the first input in the second direction, wherein the optical cross-connect is configured to switch the injection signal and the third set of optical signals through the one of the optical cross-connect outputs to the second input to switch a wavelength of the optical signals corresponding to a second one of the service providers to a wavelength channel of the third set of optical signals of the first remote user to automatically switch an optical connection of the first remote user from a first one the first plurality of service providers to the second one of the first plurality of service providers;

a second WDM multiplexer/de-multiplexer at a remote location coupled to the first multiplexer/de-multiplexer to de-multiplex the first optical signals and to multiplex the second optical signals;

a first switch having a first port to connect to the one of the optical cross-connect inputs, and a second port to connect to one of the optical cross-connect outputs;

a first monitoring unit connected to the first switch to monitor the integrity of first optical links between the first plurality of the service providers and the optical cross-connect when the first switch is in a first position, and wherein the first monitoring unit monitors the integrity of second optical links between the second plurality of the remote users and the optical cross-connect when the first switch is in a second position;

a second switch connected between the first multiplexer/de-multiplexer and the second multiplexer/de-multiplexer;

and a second monitoring unit connected to the second switch, wherein the second monitoring unit monitors the optical power of the optical signals transmitted in the first direction when the second switch is in a first position, and wherein the second monitoring unit monitors the optical power of the optical signals transmitted in the second direction when the second switch is in a second position.

10. The system of claim 9, wherein the optical cross-connect is an optical switch, an optical fiber patch panel, or any combination thereof.

11. The system of claim 9, wherein the first monitoring unit includes an optical time domain reflectometer.

12. The system of claim 9, wherein the second monitoring unit includes an optical spectrum analyzer.

13. The system of claim 9, further comprising
first transceivers coupled to the optical cross-connect to generate the first optical signals; and
second transceivers coupled to the second multiplexer/de-multiplexer to generate the second optical signals.

14. The system of claim 13, wherein at least one of the first transceivers and the second transceivers includes a wavelength-locked light source.

15. The system of claim 13, wherein at least one of the first transceivers and the second transceivers includes a wavelength specific light source.

16. The system of claim 9, wherein the multiplexer/de-multiplexer is temperature insensitive.

17. The apparatus of claim 9, wherein the multiplexer/de-multiplexer has at least one wavelength channel that carries wavelengths from multiple wavelength bands.

18. A method, comprising:
transmitting by a first wavelength-locked light source a first set of optical signals corresponding to a first service provider through a first input of a cross-connect to a first wavelength channel in a first direction;
transmitting by a broadband light source a first injection signal in a second direction opposite to the first direction;
transmitting by a second wavelength-locked light source a second set of optical signals corresponding to a second service provider through a second input of a cross-connect to a second wavelength channel in the first direction, wherein each of the first wavelength-locked light source and the second wavelength-locked light source includes one of a Fabry-Perot laser diode, a Reflective Semiconductor Optical Amplifier ("RSOA"), and other optical transmitter configured to operate below a lasing threshold when being suppressed by an injected spectral light signal;
receiving by the first input of the cross-connect the first set of optical signals;
receiving by the second input of the cross-connect the second set of optical signals;
receiving by one of outputs of the cross-connect the first injection signal and a third set of optical signals transmitted in the second direction from a remote user, wherein the third set of optical signals and the injection signal are transmitted through the one of the outputs of the cross-connect to the first input in the second direction;
multiplexing the first set and the second set;
de-multiplexing the first set and the second set at a remote location to supply the first set through a third wavelength channel to a first remote user and to supply the second set through a fourth wavelength channel to a second remote user; and
automatically switching the transmission of the injection signal and the third set of optical signals through the one of the optical cross-connect outputs to the second input of the cross-connect to switch a wavelength of the second set of optical signals corresponding to the second service provider to a wavelength channel of the third set of optical signals of the first remote user to automatically switch an optical connection of the first remote user from the first service provider to the second service provider;
monitoring an integrity of optical links between service providers and remote users by a first monitoring unit connected to a first switch, wherein the first switch has a first port to connect to the one of the optical cross-connect inputs, and a second port to connect to one of the optical cross-connect outputs, wherein the first monitoring unit is configured to monitor the integrity of optical links between service providers and the cross-connect when the first switch is in a first position, and wherein the first monitoring unit is configured to monitor the integrity of optical links between remote users and the optical cross-connect when the first switch is in a second position;
and
monitoring an optical power of the optical signals along wavelength channels by a second monitoring unit connected to a second switch, wherein the second switch is connected between the first WDM multiplexer/de-multiplexer and a second multiplexer/de-multiplexer at the remote location, wherein the second monitoring unit is configured to monitor the optical power of the optical signals transmitted in the first direction when the second switch is in a first position, and wherein the second monitoring unit is configured to monitor the optical power of the optical signals transmitted in the second direction when the second switch is in a second position.

19. The method of claim 18, wherein the first injection signal is transmitted through the first wavelength channel, and wherein the first injection signal is switched to the second service provider to change an optical connection of the first remote user from the first service provider to the second service provider.

20. The method of claim 19, wherein the switching includes setting a wavelength of the second set of optical signals to propagate through the first wavelength channel.

21. The method of claim 18 further comprising
transmitting a fourth set of optical signals from the first remote user in the second direction;
transmitting a fifth set of optical signals from the second remote user in the second direction;
multiplexing the fourth set and the fifth set at the remote location; and
de-multiplexing the fourth set and the fifth set to supply the fourth set through the first wavelength channel to the first service provider and to supply the fifth set through the second wavelength channel to the second service provider.

22. The method of claim 18, further comprising
transmitting a second injection signal in the first direction.

* * * * *